United States Patent
Goldman

[11] Patent Number: 5,880,712
[45] Date of Patent: Mar. 9, 1999

[54] DATA INPUT DEVICE

[76] Inventor: Alfred Goldman, 444 E. 82nd St., New York, N.Y. 10028

[21] Appl. No.: 576,482

[22] Filed: Dec. 21, 1995

[51] Int. Cl.$^6$ .................................................. G06F 3/023
[52] U.S. Cl. ........................................... 345/168; 345/175
[58] Field of Search ................................... 345/158, 161, 345/168, 170, 175; 341/27, 33, 34; 400/472, 479–479.2

[56] References Cited

U.S. PATENT DOCUMENTS

| | | | |
|---|---|---|---|
| 2,736,034 | 2/1956 | Fredenhagen | 2/161 |
| 4,414,537 | 11/1983 | Grimes | 340/365 R |
| 4,954,817 | 9/1990 | Levine | 345/156 |
| 4,971,465 | 11/1990 | Hashimoto | 400/485 |
| 5,070,330 | 12/1991 | Wu | 341/26 |
| 5,141,343 | 8/1992 | Roylance | 400/472 |
| 5,163,765 | 11/1992 | Levy | 400/492 |
| 5,305,410 | 4/1994 | Arroyo | 385/109 |
| 5,305,411 | 4/1994 | Arroyo | 385/109 |
| 5,444,462 | 8/1995 | Wambach . | |
| 5,489,922 | 2/1996 | Zloof | 345/156 |
| 5,605,406 | 2/1997 | Bowen | 345/168 |
| 5,638,092 | 6/1997 | Eng et al. | 345/158 |
| 5,706,026 | 1/1998 | Kent et al. | 345/156 |

OTHER PUBLICATIONS

Touch Memory internet article at www.decros.cz/en/products, pp. 1–4, May 29, 1998.

TouchProbe internet article at www.videx.com, pp. 1–2, May 29, 1998.

*Primary Examiner*—Jeffery Brier
*Attorney, Agent, or Firm*—Cohen, Pontani, Lieberman & Pavane

[57] ABSTRACT

A data entry device, including a plurality of sensing devices worn on a user's fingers, and a flat light-weight keypad for transmitting signals indicative of data entry keyboard functions to a computer or other data entry device. The sensing devices include sensors are used to detect unique codes appearing on the keys of the keypad or to detect a signal, such as a radar signal, generated by the signal generating device mounted to the keypad. Alternatively, sensing devices may be mounted to the keypad to determine the location of a user's finger upon selection of a keypad key. Pressure sensitive switches, one associated with each finger contain resistive elements and optionally sound generating means and are electrically connected to the sensors so that when the switches are pressed they activate a respective sensor and also provide a resistive force and sound comparable to keys of a conventional keyboard. Alternatively, a flat fully functional keyboard or touchscreen, which does not provide the user with significant tactile or auditory indication of a user's selection of a key, can be used and pressure sensitive switches containing resistive elements and optionally sound generating means are mounted to the user's fingers.

4 Claims, 4 Drawing Sheets

DATA INPUT DEVICE

FIELD OF THE INVENTION

The present invention relates to a device for entering data or signals to an electronic device such as a computer, telephone, electronic game, cash register, electronic musical keyboard or other electronic device having a data entry keyboard.

BACKGROUND OF THE INVENTION

There are many known types of keyboards used for inputting keystrokes and various other commands and data to electronic devices. These keyboards typically are large and bulky, and their use can thus be awkward, especially if there is a limited amount of space available for using the keyboard. In particular, full-size keyboards used with a desktop computer take up a large amount of desk space which could be used for other purposes. Such large keyboards have also been cited as the cause of certain hand or arm muscular problems, such as carpel tunnel syndrome. As such keyboards include within them various electrical components for transmitting the keystroke signals to the computer, should the user spill liquid or deposit other foreign substances onto the keyboard, a malfunction of the keyboard is likely to result.

A device that substitutes for a typical desktop keyboard is disclosed in U.S. Pat. No. 4,414,537 in which keystroke signals are based on sign language, i.e., hand shapes corresponding to the alphabet and various words used to communicate with the deaf and/or hearing-impaired. Sensors mounted to a glove's surface detect the flexing of finger joints and the contacts between various portions of the user's hand. The signals are transmitted to a computer which translates the user's hand shapes into the word, letter, number, etc., corresponding to the hand shapes. This device, however, is unable to perform all of the operations of a conventional keyboard, requires knowledge of another language, sign language, to operate it, and cannot be used in any way other than translating sign language into computer readable form.

Devices that have attempted to make a keyboard more compact include fold-up or collapsible keyboards. However, the bulky electrical components of these keyboards limit how small and light-weight these keyboards may be. Although a keyboard or other data entry device may be temporarily removed from a workspace to create additional workspace, this option is not available for portable laptop computers with their attached keyboards. In fact, the size of a keyboard for a laptop computer or computer notebook is often one of the main size limiting factors for the device.

There is therefore a need for a device that can perform the same functions as a conventional keyboard for a data entry device but which is light, compact, and easy to use.

SUMMARY OF THE INVENTION

In accordance with a first embodiment of the present invention, a conventional keyboard, such as one for a computer, a calculator, a cash register, a video or computer game, a musical instrument or any other kind of data entry device, is replaced by a thin, flat keypad on which is printed the key layout of the keyboard being replaced. Each key of the keypad incorporates a code uniquely representative of the key. The codes for the keys may be stored in electronic or magnetic microchips one for each key embedded in the keypad. The codes may also take the form of optically scannable bar codes printed in colored or metallic ink on the faces of the keys, or raised tactile codes, such as braille, formed on the surfaces of the keys. Because the keypad is thin and need not include any bulky mechanical or electrical elements, it may be designed so that it is flexible and light-weight and can be folded or rolled up for compact storage.

The keypad's key codes are selectively read by sensing devices mounted to each of a user's fingers. The sensing devices may be secured to fingers of gloves worn by the user, or to a plurality of rings or thimbles worn on the user's fingertips. Alternatively, the sensing devices may be affixed directly to the user's skin using a removable fixative. When the user touches a key of the keypad, sensors in the sensing devices detect and decode the code to the key that has been touched and a signal is transmitted to the computer or other data processing device indicative of the key that has been selected by the user. To simulate the feel of a conventional keyboard, a pressure sensitive switch is preferably included in each of the sensing devices in which is incorporated a resistive element. The pressure sensitive switch is interposed between the user's finger and the surface of the sensing device contacting the keypad so that when the user touches the keypad, the user's finger experiences a resistance and a springiness. The pressure sensitive switches may also be electrically connected to the sensors so that the sensors are activated only when a respective switch has been depressed and thus closed. The sensing devices may also incorporate either electrical or mechanical audio confirmation signal devices which generate a sound when the switches have been closed. Indicator lights are preferably attached to the glove or otherwise mounted to the hand or wrist of the user to indicate when certain switch-type keys of the keypad have been selected, such as the "CAPS LOCK" key.

In accordance with another embodiment of the present invention, a flat keyboard which is fully functional electronically but which does not give the user the feel of a conventional keyboard may be used in conjunction with sensing devices that incorporate only the pressure sensitive switches and optionally the audio confirmation signal devices. Here, the keyboard may be one substantially like that incorporated into flat hand-held calculators or a touch sensitive television screen (a "touch screen"). The pressure sensitive switches, with their resilient elements, provide the user with the feel of a conventional keyboard, while the audio confirmation signal devices provide the otherwise missing sounds of conventional keyboard operation.

In another embodiment, a signal transmitted for each of the sensing devices is indicative of the user's selection of a single, unique function. No keypad is required, and each sensing device need include only a pressure sensitive switch, although an audio confirmation device may also be included. A signal from a sensing device, resulting from pressing the sensing device against any rigid surface, is thus understood by the data processing device as an indication that the particular function associated with that sensing device has been selected by the user. This embodiment may be used in conjunction with video or computer games where depressing of one finger can be interpreted as, for example, a "fire" command, and depressing of another finger can be interpreted as, for example, a "jump" command. Alternatively, more than one sensing device may be mounted to a single finger so that selective depression of the finger against a surface will simulate "joystick" action.

In another embodiment, the keypad is a thin, flat sheet on which is printed the key layout of the keyboard being replaced. Two signal generators are mounted to the periphery of the keypad so that they are spaced apart from one another. When activated, sensors mounted on the user's finger tips detect the generated signals, and determine the distance between the sensors and the signal generators. These two distances are then translated into coordinates on the keyboard to identify which key has been selected by the user. As discussed above, the finger-mounted sensors are preferably activated when the user depresses the keypad. Alternatively, the signal generators may also receive a signal reflected from the user's finger that has touched the keypad. In this case, the transmitted signal, which may for example be a radar signal, is received by the keypad-mounted signal generator/detector which then determines the location of the user's finger and thus which key has been selected. The finger mounted devices need only include the pressure sensitive switches, with their resilient elements, to provide the user with the feel of a conventional keyboard, and/or the audio confirmation signal devices to provide the otherwise missing sounds of conventional keyboard operation. Alternatively, only one keypad-mounted signal generator/detector may be used, provided that the detector can determine not only the distance between the user's finger and the generator/detector but also the direction of the finger relative to the keypad layout so that this information can be used to determine which keypad key has been selected by the user.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
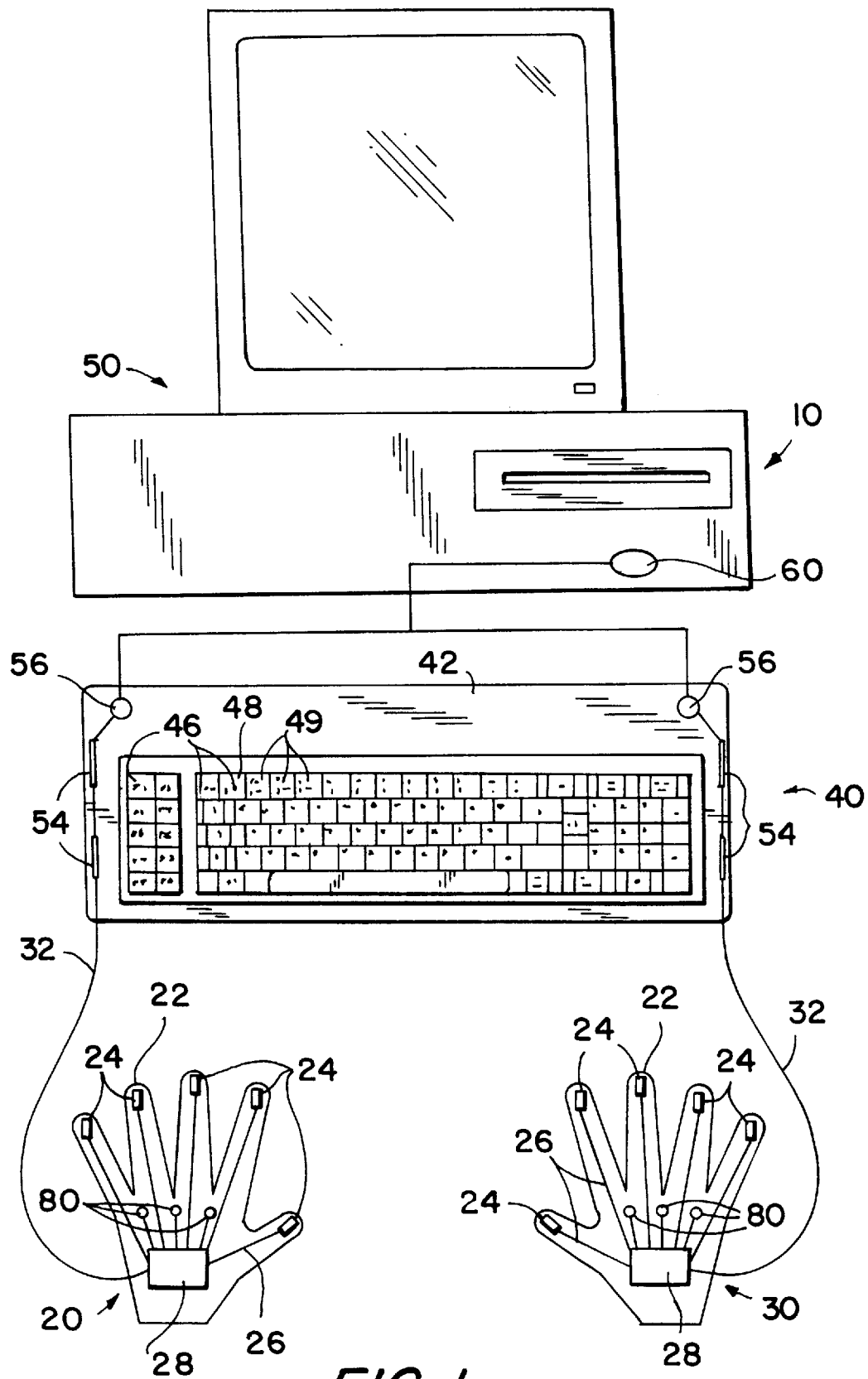
FIG. 1 diagrammatically illustrates a first embodiment of the present invention.

FIG. 1 shows a first embodiment of a data entry system 10 employing the data entry device of the present invention. The system 10 includes a pair of gloves 20, 30, respectively, a keypad 40 and a computer 50. Each glove 20, 30 is identical, except that one glove 20 is designed to be worn on the left hand and the other glove 30 on the right hand. Although-two gloves are shown, alternatively only one glove may be required for a particular type of data entry keypad 40. Each glove 20, 30 has five digits 22, each accommodating a respective finger of a user. At the tip of each digit 22 of the gloves 20, 30 is securely mounted a sensing device 24. Although each glove 20, 30 is shown as having five digits, alternatively one or both gloves may have less than five digits, and thus less than five sensing devices 24, depending on the particular keypad 40 to be used. Additionally, the gloves 20, 30 need not cover the entire hand of the user but only a sufficient portion thereof so that there is sufficient surface area for securely mounting the various elements to be attached thereto, as discussed below. The sensing devices 24 include sensors 64 shown in FIG. 2 which detect and decode coded information that appears on the keypad 40, as discussed in detail below. The sensing devices 24 may be mounted to the outer or inner surface of the gloves 20, 30 or in between the surfaces, depending upon what type of sensing devices 24 are being used. For example, if the sensing devices 24 require an unobstructed view of the code to be detected, the sensing devices 24 must be mounted to the outer surface of the gloves 20, 30, or at least so that the sensing portion of the sensing devices 24 is exposed. However, if the sensing devices 24 are capable of operating through the material comprising the gloves 20, 30, they may alternatively be mounted within the material of the gloves 20, 30 or on the inner surface of the gloves 20, 30.

Each of the sensing devices 24 is connected through a respective wire 26 to a coupling device 28, preferably one for each glove 20, 30. Although the coupling device 28 is shown as being mounted on the palm or back of each glove 20, 30, alternatively the coupling devices 28 may be separate from and not mounted to the gloves 20, 30. The coupling devices 28 multiplex or further process the signals generated by the sensing devices 24 and transmit these encoded signals through wires 32 to a keyboard input port 60 on the computer 50. The coupling devices 28 may also aid in decoding the signals generated by the sensors 64 to identify which keypad key code has been detected. The coupling devices may additionally perform all of the functions performed within a conventional keyboard relating to determining which keyboard key has been depressed and what signal to transmit to the computer to relay this information. The computer 50 may alternatively be any one of a number of other electronic devices that require data entry by a user for its operation such as a microprocessor or a video game device. Although the signal transmitted from the coupling devices 28 to the computer 50 is shown as being transmitted by wires 32, alternatively the signals may be transmitted wirelessly by connecting a wireless communication device, such as an infrared, radio or microwave transmitter, to the coupling device 28 and a wireless communication receiver to the keyboard input port 60 of the computer 50. Such conventional wireless communication devices are commonly incorporated into remote controls for televisions and other consumer electronic devices.

Figure 2:
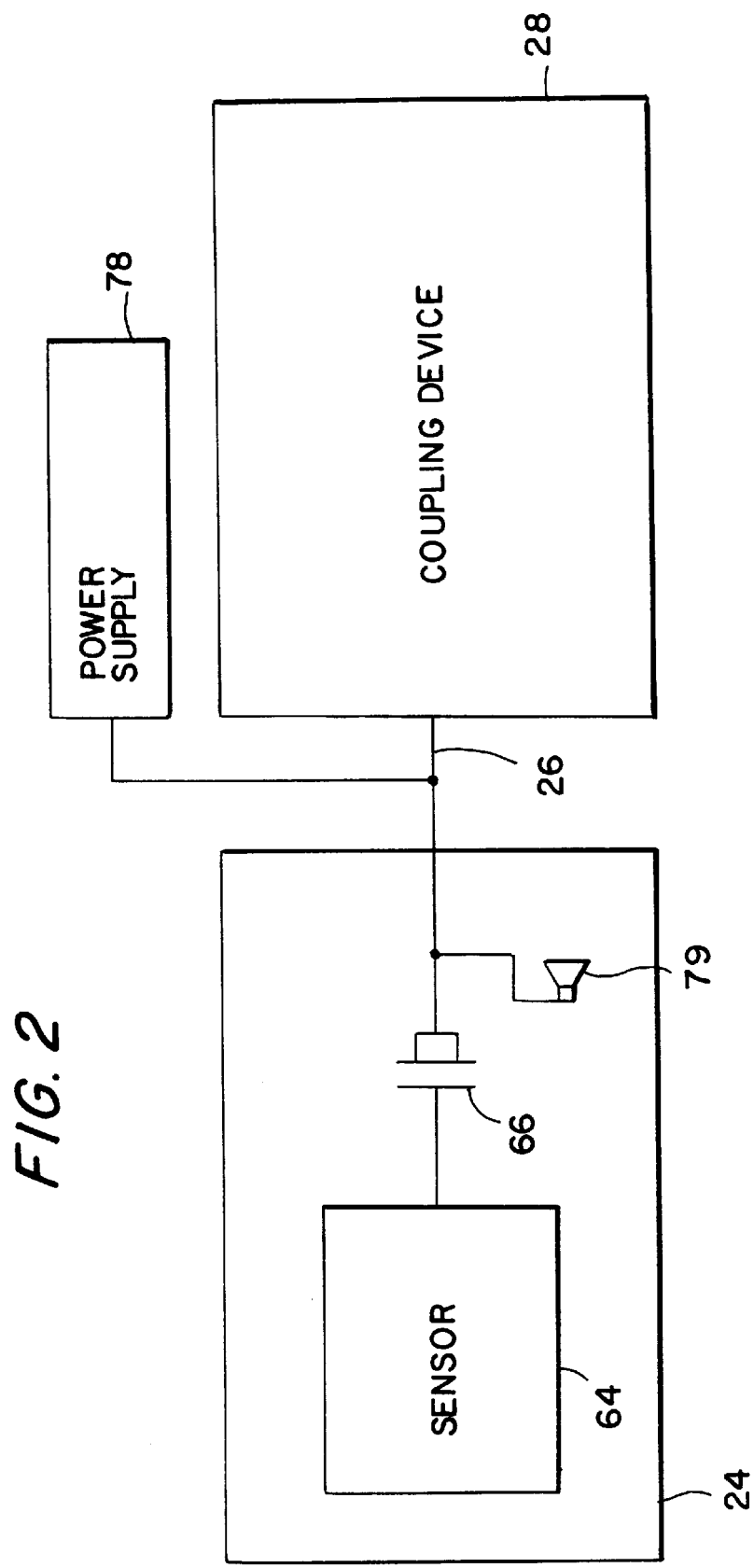
FIG. 2 is a conceptual block diagram of some of the components shown in the embodiment of the present invention shown in FIG. 1.

Referring now to FIG. 2, each sensing device 24 includes a sensor 64 and preferably a pressure sensitive switch 66. The sensors 64 are devices which are able to sense and decode a plurality of codes that have been imprinted or mounted to the keypad 40, as discussed below. A number of different types of sensors 64 may be used depending upon how the codes are included onto the keypad 40. For example, the sensors 64 may be electronic devices which read the information stored on electronic or magnetic microchips mounted to the keypad 40. Such devices are marketed under the trademarks "Touch Memory" and "TouchProbe". The sensors 64 may be magnetic sensors which detect and decode magnetic codes stored on magnetic strips or other information storage media mounted to the keypad 40. The sensors 64 may also be scanners which read bar or other types of codes imprinted on the keypad 40 in colored or metallic ink. Alternatively, the sensors 64 may be such that they can read a raised tactile code such as braille symbols incorporated onto the keypad 40.

The pressure sensitive switches 66 preferably have two functions. The switches 66 are used to activate the sensors and to simulate to the user the feel of using a conventional keyboard. When a switch 66 is closed, its respective sensor 64 is electrically connected to its coupling device 28. The pressure sensitive switches 66 are situated on each digit 22 of the gloves 20, 30 so that when the user touches the keypad 40 with a finger, the switch 66 is between the keypad 40 and the user's finger. Consequently, the switch 66 closes when the user presses that finger to the keypad 40. The pressure sensitive switch 66 may be of any conventional type. To simulate the "feel" of a conventional keyboard, the switches 66 are preferably provided with a degree of resistance when pressed which may be supplied by springs, spongy foam, or other resilient means.

Each sensing device 24 may optionally be provided with an audio confirmation signal device 79 which provides an audio signal, such as a "click" or "beep", when a corresponding switch 66 is closed to confirm to a user that the sensor 64 has been activated, thereby providing, in combination with the pressure sensitive switch 66, an audible and tactile confirmation that a selected key of the keypad 40 is being sensed by the sensor 64. The audio confirmation devices 79 may alternatively be mechanically, rather than electronically operated, and optionally included in the pressure sensitive switches 66 such that they generate a sound when the respective switch 66 is closed. A power supply 78, schematically shown in FIG. 2, provides electrical power to the sensors 64, the audio confirmation signal devices 79, and the coupling devices 28. The power supply 78 may be mounted to each glove 20, 30 or alternatively may be located remote from the gloves 20, 30, such as proximate or within the computer 50, to minimize the weight of the gloves 20, 30. Thus, the power supply 78 may thus be a battery or may constitute the power supply of the computer 50. The power supply 78 may be electrically connected between its coupling device 28 and the computer 50 in such a way that power is supplied to the coupling device 28 and its associated sensors 64 only when a pressure sensitive switch 66 is closed.

Returning to FIG. 1, also connected to the coupling device 28 and preferably attached to the gloves 20, 30 are a plurality of indicator lights 80 which are used to indicate when certain of the keyboard keys, which act like switches, have been activated, as discussed in detail below. The indicator lights 80 may, for example, be low wattage light bulbs or light emitting diodes.

The keypad 40 is preferably a passive device, containing no movable parts, and is preferably made of a thin, flexible material which can be easily and compactly folded or rolled up when not in use. Printed on a face 42 of the keypad 40 are a plurality of boxes 44, each representative of a separate key on the particular type of keyboard that is to be used with the computer 50 or other data entry device. Thus, keypad 40 may alternatively have imprinted thereon any of various keyboard configurations dependent upon the particular keyboard to be replaced by the device of the present invention, for example, if the keyboard to be replaced in accordance with the present invention were for use with a video game employing ten keys, the keypad 40 used with the present invention would also have ten boxes 44. Within each box 44 of the keypad 40 is printed a respective function 46, such as, for example, a letter, number, symbol or command that may be entered by the user. Also within each box 44 is a code 48 representative of that function. The type of code 48 incorporated into each box 44 and the way in which the code 48 exists in each box 44 is such that it is readable by the sensors 64 of the sensing devices 24. Thus, if the code is to be stored in an electronic or magnetic microchip or magnetic strip, the chip or magnetic strip is embedded into the keypad 40 below each key box 44. If an optically scannable bar code or raised tactile code is employed, the code for each key appears on the faces of each of the boxes 44.

Preferably, positioned along opposing sides of the keypad 40, if a hardwired communication system is used, are retaining clips 54 which are used to retain the wires 32 in their path from the gloves 20, 30 to the computer 50. The clips 54 prevent the wires 32 from interfering with the user's access to the keypad 40. The keypad 40 may also include one or more electrical interfaces 56, such as a line coupler, between the components of the gloves 20, 30 and the computer 50.

In operation, the passive keyboard 40 is unfolded or unrolled and positioned in front of the user. The user then places the gloves 20, 30 on his hands such that each sensing device 24 is positioned on the bottom of a finger tip. If signals are to be transmitted by wire to the computer, rather than wirelessly, the wires 32 are then connected, through the adapters 56, if used, to the keyboard input port 60 of the computer 50. The wires 32 may then be secured within the retaining clips 54. If the power supply 78 is used, it is appropriately connected. The user then uses the keypad 40 in the same way as he would use a conventional keyboard.

When the user's fingertip contacts a box 44 of the keypad 40, which corresponds to a key of a conventional keyboard, the pressure sensitive switch 66 associated with that fingertip closes, thereby activating the appropriate sensor 64 which then reads the code 48 appearing in the box 44 contacted by the sensor 64. The sensor 64 then transmits an appropriate signal to the computer 50 representative of the function 46 printed within the box 44. If the box 44 touched is a box representative of a keyboard switch key, the appropriate indicator light 80 on the appropriate glove is illuminated. Such keyboard switch keys are those that when activated, remain active until the key is activated a second time. For a conventional computer keyboard, such keys include the "CAPS LOCK" key, the "NUM LOCK" key and the "SCROLL LOCK" key. As is the case in conventional keyboards, the particular indicator light 80 remains illuminated until the appropriate switch key is touched again by the user. The indicator lights 80 inform the user that the particular switch key has been activated and that all subsequently keys that are activated will be affected by the switch key. Key functions which involve multiple simultaneous keystrokes, such as activating the "SHIFT" key and a letter of the alphabet, are handled by the present invention in the same fashion as a conventional keyboard. In view of the resistance provided during the closing of the switches 66, the feel of a conventional keyboard with its spring loaded key is obtained even though the user is pressing the flat keypad 40 with no moving parts.

Figure 4:
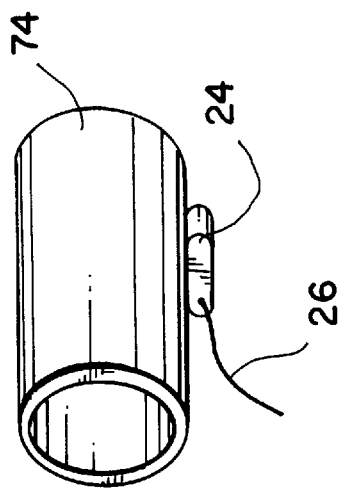
FIG. 4 is a perspective view of a thimble for mounting a sensing device for use in accordance with the present invention.
Figure 3:
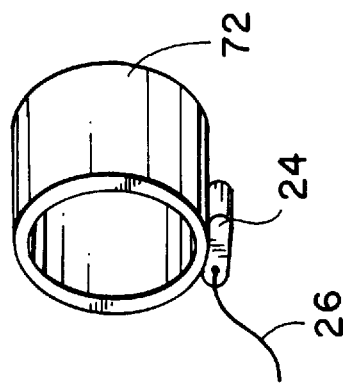
FIG. 3 is a perspective view of a ring for mounting a sensing device for use in accordance with the present invention.

In the alternative embodiment of the present invention shown in FIG. 3, each sensing device 24 is mounted to a ring 72 which is sized and shaped to fit securely proximate to a user's fingertip. The ring 72 may be made of a rigid material, such as, for example, plastic and metal, a flexible material, such as, for example, cloth, leather and rubber, and may include one or more elasticized portions or a fast tightening mechanism such Velcro fasteners. Alternatively, as in the embodiment shown in FIG. 4, the sensing devices 24 may be mounted to the tips of a thimbles 74 sized and shaped to fit securely to a user's fingertip. In use, the rings 72 or thimbles 74 are position on the fingertips so that the sensors 64 of the sensing devices 24 face downward toward the keypad 40. A user may use less than ten of these rings 72 or thimbles 74 depending upon the particular keypad to be used and the user's preference. Thus, if a user uses less than ten fingers for data entry, fewer than ten rings 72 or thimbles 74 are required. For the embodiments shown in FIGS. 3 and 4, the coupling device 28 connected to the sensing devices 24 and the indicator lights 80 may be mounted on each of the user's hands or wrists, such as on a wrist band or watch band, or at another location proximate to each hand. Alternatively, each of the sensing devices may be attached directly to the user's fingertips using a temporary fixative.

In another embodiment of the present invention, the sensing devices 24 include merely the pressure sensitive switches 66 and optionally the audio confirmation devices 79, thus eliminating the sensors 64. The pressure sensitive switches 66 are designed so that they provide a degree of resistance when pressed. The audio confirmation devices 79, if used, are connected to the switches 66 so that they emit an audible sound when their respective switch 66 is closed. In this particular embodiment, the keypad 40 functions exactly like a conventional keyboard except that it is virtually flat and the keys provides little resistance or sound when depressed. The keypad 40 is electrically connected to the computer 50 or other data processing device. Alternatively, the keypad 40 may wirelessly transmit its signals to the computer. The construction of such flat keypads used in this embodiment, which are often used in conventional hand-held calculators, is well known and may include two electrically non-conductive substrates each having a plurality of lines or paths of conductive material on abutting surfaces. Between these two substrate layers is a layer of non-conductive material with a plurality of apertures, one for each key of the keyboard. The entire keypad is hermetically sealed. When an individual key is pressed, the conductive paths on the upper and lower substrates selectively contact one another and complete a unique circuit to signal the computer or microprocessor that a particular key has been depressed. Other known flat keypads may also be used in accordance with this embodiment of the present invention. However, these types of keypads, though lightweight, thin and fully functional by themselves, do not provide the user with same feel of a conventional keyboard and do not provide the user with a clear indication that a key has been depressed. A "touch screen" (i.e., a pressure sensitive computer monitor) has the same problem. These functions are provided by the sensing devices 24 of this embodiment of the present invention which are affixed to gloves 20, 30, rings 72 or thimbles 74 and which provide the resistance, by means of switches 66, and the sound, by means of audio confirmation devices 79, that accompany the operation of a conventional keyboard. The keypad 40 may be made so that it can be folded or rolled for compact storage.

In another embodiment of the present invention, each sensing device 24 may have a single, unique function. No keypad is required, and only a pressure sensitive switch 66 is required for each sensing device, although an audio confirmation device 79 may also be included. A signal from a sensing device 24 is unique and is thus understood by the computer or other data processing device as an indication that the particular function associated with that sensing device 24 has been selected by the user. The user can thus activate a sensing device 24 by merely pressing the sensing device 24 against any rigid surface. This embodiment is particularly applicable for use with video or computer games where depressing of one finger, for example, can be interpreted by the data processing device as a "firing" command for a depicted action figure. Alternatively, more than one sensing device 24 may be mounted to a single finger. Thus, for example, if four sensing devices 24 are mounted to the same finger, selective activation of the sensing devices can communicate an "up", "down", "left" or "right" command, thereby simulating the operation of a "joystick". The sensing devices 24 may communicate with the computer either by wire or wirelessly as discussed above with reference to the embodiment shown in FIG. 1.

Rather than affixing the sensing devices 24 to a glove, ring or thimble, the sensing devices may alternatively be affixed directly to the fingers using rubber cement or other fixative allowing subsequent removal of the sensing devices.

Figure 5:
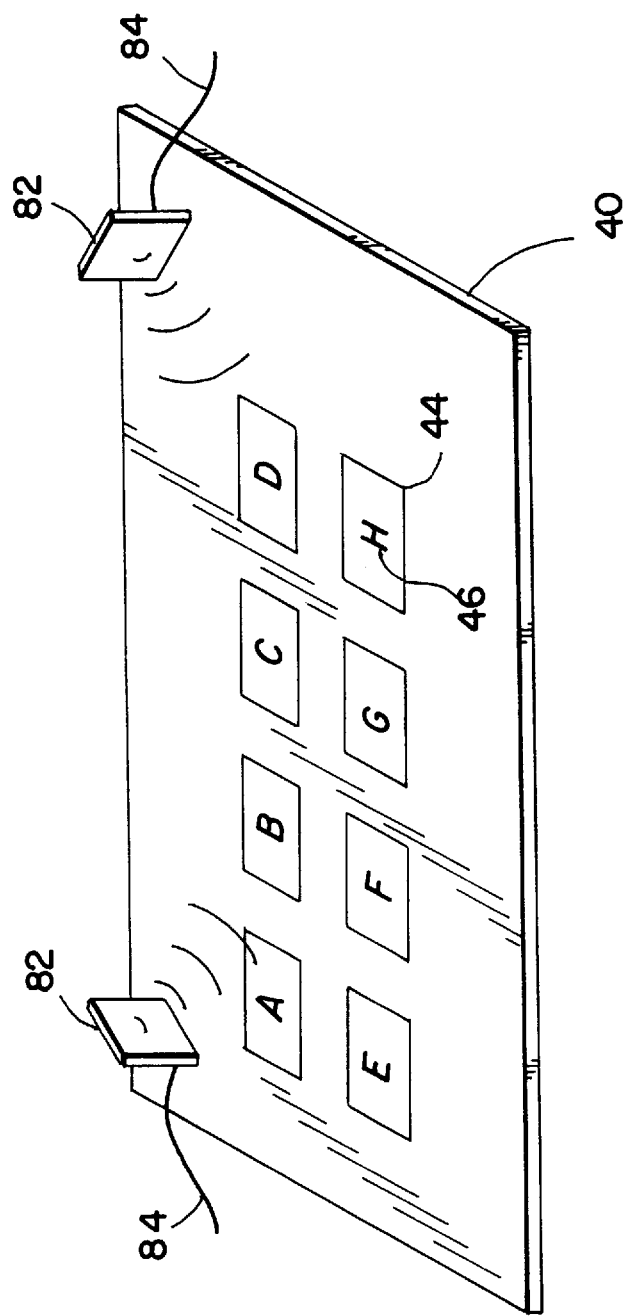
FIG. 5 is a perspective view of another embodiment of the present invention.

In another embodiment shown in FIG. 5, the keypad 40 is a thin, flat sheet on which is printed the keys 44 and functions 46 of the keyboard being replaced. Two signal generators 82, such as, for example, generators of radar or laser light signals, are mounted to the periphery of the keypad 40 so that they are spaced apart from one another. The signal generators 82 are connected by wires 84 to a power source (not shown) and/or a data processing device (not shown). When a user depresses the sensing device 24 mounted on a user's finger, the sensing device 24 is activated and detects the signals generated by the signal generators 82, and determines in conjunction with the coupling device 28 and the connected data processing device the distance between the activated sensing device 24 and the signal generators 82. These two distances are then translated into coordinates on the keyboard to identify which key 44 has been selected by the user.

Alternatively, the signal generators 82 may also receive a signal reflected from the user's finger that has touched a key 44 of the keypad 40. In this case, the transmitted signal, which may for example be a radar or laser signal, is received by the keypad-mounted signal generator/detector 82 which then determines, in conjunction with a connected data processing device, the location of the user's finger and thus which key 44 has been selected. The finger mounted sensing devices 24 need only include the pressure sensitive switches 66, with their resilient elements, to provide the user with the feel of a conventional keyboard, and/or the audio confirmation signal devices 79 to provide the otherwise missing sounds of conventional keyboard operation. Alternatively, only one keypad-mounted signal generator/detector 82 may be used, provided that the generator/detector 82 can determine not only the distance between the user's finger and the detector but also the direction of the finger relative to the keypad layout so that this information can be used to determine which keypad key 44 has been selected by the user.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A data entry apparatus for inputting signals indicative of keyboard functions to a data entry device, comprising:
   a keypad comprising:
      a plurality of keys, with each key being uniquely indicative of a corresponding keyboard function;
      a signal generating means for generating a signal directed toward the keys of the keypad;
   a sensing means mounted to a fingertip of a user for detecting the signal generated by the signal generating means and for generating an electrical signal in response thereto; and
   a signal processing means for receiving the electrical signal generated by the sensing means, for determining a location of the fingertip of the user upon selection by the user of a key, for determining which key has been selected by the user's fingertip, and for transmitting the keyboard function corresponding to the selected key to the data entry device.

2. The data entry apparatus of claim 1, wherein said sensing means further comprises a pressure sensitive switching means for activating said sensing means and said signal generating means when said switching means is activated.

3. The data entry apparatus of claim 2, further comprising a pressure resistive means for providing a resistive mechanical force for activation of said switching means.

4. The data entry apparatus of claim 2, further comprising a sound generation means for generating a sound when said switching means is activated.

* * * * *